Jan. 24, 1961 G. F. EVANS 2,968,881

NUMBER FINDER AND TELEPHONE RECEIVER MINDER

Filed Jan. 5, 1960

INVENTOR

George F. Evans

United States Patent Office 2,968,881
Patented Jan. 24, 1961

2,968,881

NUMBER FINDER AND TELEPHONE RECEIVER MINDER

George F. Evans, 649 Washington Ave. NE., Warren, Ohio

Filed Jan. 5, 1960, Ser. No. 561

1 Claim. (Cl. 40—68)

This invention relates to a telephone number reference device, and more particularly to such a device incorporated in a line holding receiver cradle.

A telephone self dial system is currently being installed throughout the country which will enable people to call distant parties without the aid of exchange operators. Such a system involves very long telephone numbers which cannot readily be memorized and cannot rapidly be determined by reference to a directory. It would therefore be expedient if such numbers, once determined, were recorded in a manner for ready reference at some future occasion. Further, when using a wall type telephone, there is seldom a suitable area upon which to record such information, and it would be an advantage if a means was provided such that the desired number could be read while standing and during the course of dialing the number. The present invention provides such a device which incorporates a cradle for temporary location of the hand set, a convenience which avoids the necessity of allowing the hand set to hang by its cord down the side of the wall.

It is therefore a primary object of this invention to provide a telephone number reference device which may be incorporated as part of a line holding receiver cradle.

It is a further object of this invention to provide a telephone number reference device of the above class which may be opened for the purpose of changing numbers or replacing a revised number on the roll.

It is a still further object of this invention to provide a telephone number reference device in combination with a receiver cradle which may be manufactured at low cost, and which simplifies the task of dialing numbers having a large number of digits.

The invention consists of a rotating drum mounted within a casing which is removably secured to a wall bracket. Telephone numbers are recorded along the length of the drum and around the circumference thereof. A slot is formed in a wall of the casing so that a selected number may be readily seen. On each end of the drum and disposed outwardly of each end of the casing, is a small circular hand knob secured to the ends of a shaft passing centrally through the drum. One of the knobs is provided with flat surfaces around the circumference which align with the numbers recorded on the drum for the purpose of identification. The top of the casing is provided with upstanding lugs which serve as a cradle for temporarily holding the telephone hand set.

A full understanding of the details of the invention, together with further advantages, will become apparent by reference to the following detailed description of a preferred embodiment thereof, taken in conjunction with the attached drawings wherein.

Similar reference characters indicate corresponding parts throughout the several views in the drawing.

Figures 1, 2, 3, 4, 5, 6:
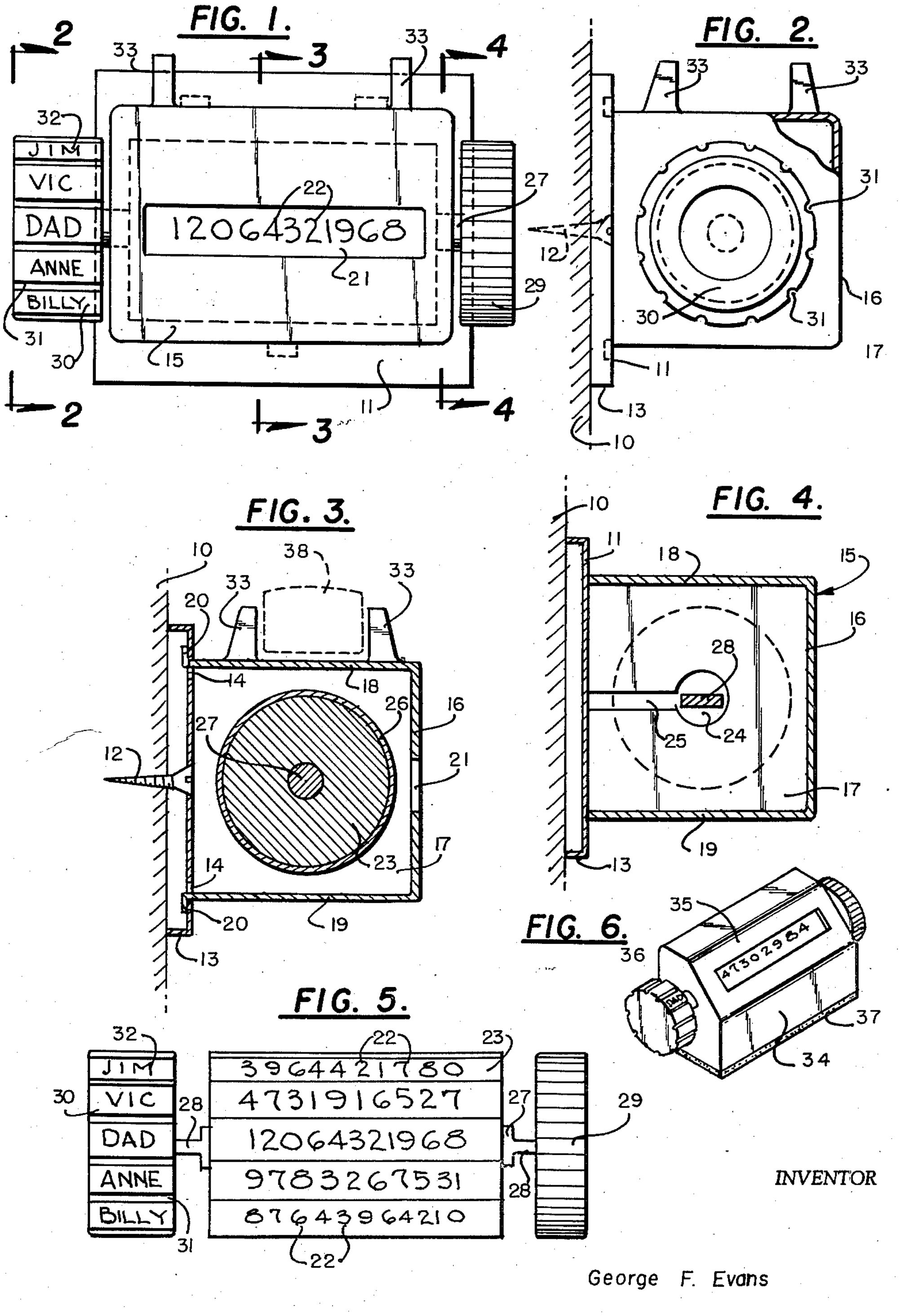
Fig. 1 is a front elevation of the reference device shown mounted on a wall for use in conjunction with a wall type telephone.
Fig. 2 is a side elevation of the device taken along the line 2—2 of Fig. 1.
Fig. 3 is a cross sectional side elevation taken along the line 3—3 of Fig. 1.
Fig. 4 is a cross sectional side elevation of the assembled device taken along the line 4—4 of Fig. 1.
Fig. 5 is a front elevation of the revolving drum which is removably housed within the casing, and contains the telephone reference numbers.
Fig. 6 is a perspective view of a modified form of the number reference device particularly adapted for desk or table use.

Referring now to the drawing in detail, the numeral 10 represents a wall on which a rectangular wall plate 11 is retained by suitable screws 12. The plate has a surrounding side wall 13 and three tab slots 14 formed therethrough for the purpose of removably attaching a casing 15.

The casing 15 consists of a rectangular box having a front face 16 and end walls 17. A top wall 18 and bottom wall 19 are provided with projecting tabs 20 extending from one side, and adapted to engage with the wall plate 11 through the tab slots 14. A rectangular window 21 is formed centrally through the front face 16 for the purpose of viewing telephone numbers 22 recorded axially on a drum 23. Each end wall 17 has a central hole 24 formed therein which opens through a slot 25 to the edge of the wall.

The drum 23 is cylindrical in shape and is provided with a disposable paper collar 26 upon which numbers 22 may be recorded. A shaft 27 extends centrally through the axis of the drum to terminate outwardly of each end thereof in flattened portions 28 adapted to selectively slide through the slots 25 formed in the end walls 17. A serrated finger knob 29 is rigidly secured to one of the flattened portions 28 to provide a means for rotation of the drum within the casing. A circular disc 30 is secured to the remaining flattened portion 28 and is notched symmetrically at points 31 around the circumference to divide the surface equally into sections suitable for recording identifications 32 corresponding to the numbers 22 disposed in line therewith through the window 21.

The top wall 18 of the casing is provided with four upstanding projections 33, each suitably spaced and adapted to provide a temporary rest for a telephone hand set 38.

A modified reference device 34 is shown in Fig. 6, and is specifically designed for table or desk use. The construction is similar to that already described with the exception of an angled front face 35 which receives a window opening 36. A base pad 37 replaces the wall plate 11 and may be formed of suitable non abrasive material.

From the foregoing, it is believed that the construction, operation and advantages of this invention will be fully apparent. However, since numerous modifications will occur to those skilled in the art, it is not desired to limit the construction exactly to that shown and described, and accordingly, modifications and equivalents may be resorted to, falling within the scope of the appended claim.

I claim:

A telephone number reference device, comprising, a wall plate for securing to a wall surface, a casing removably secured to the wall plate to project outwardly therefrom, a slot formed longitudinally through a forwardly extending portion of the casing, a drum mounted longitudinally beneath the slot and within the casing and supported on a shaft rotatably mounted in aligned holes formed in each end of the casing, slots formed in each end of the casing communicating with the aligned holes and terminating at said wall plate, said shaft having flattened portions at each end adapted to slidably pass through the slots and into the aligned holes for rotation therewithin, a disc having a series of flattened sections around the periphery for marking with identifications, said disc concentrically mounted on one end of the shaft in a fixed relationship therewith, a knurled disc mounted on the other end of the shaft outwardly of the casing for revolving the drum within the casing, said drum being surrounded by a disposable paper collar adapted for the recording of telephone numbers thereon in alignment with the identifications marked on the flattened sections of the first mentioned disc, said telephone numbers adapted for visual alignment through the slot upon rotation of the drum.

References Cited in the file of this patent

UNITED STATES PATENTS

| | | |
|---|---|---|
| 1,998,836 | Fullerton | Apr. 23, 1935 |
| 2,068,271 | Huott | Jan. 19, 1937 |
| 2,856,714 | Bruner | Oct. 21, 1958 |